(12) United States Patent
Wings et al.

(10) Patent No.: US 7,511,902 B2
(45) Date of Patent: Mar. 31, 2009

(54) METHOD AND DEVICE FOR ALIGNING AN OPTICAL ELEMENT

(75) Inventors: Gerd Wings, Schwenningen (DE); Christian Hoffmann, Geesthacht (DE); Klaus Wulf, Hohnstorf (DE); Carsten Michaelsen, Geesthacht (DE)

(73) Assignee: Incoatec GmbH, Geesthacht (DE)

( * ) Notice: Subject to any disclaimer, the term of this patent is extended or adjusted under 35 U.S.C. 154(b) by 61 days.

(21) Appl. No.: 11/723,554

(22) Filed: Mar. 21, 2007

(65) Prior Publication Data
US 2007/0236815 A1    Oct. 11, 2007

(30) Foreign Application Priority Data
Apr. 5, 2006    (DE) .................. 10 2006 015 933

(51) Int. Cl.
*G02B 7/02* (2006.01)
(52) U.S. Cl. ...................... 359/822; 359/823
(58) Field of Classification Search ......... 359/819–823; 378/78–84, 113, 138
See application file for complete search history.

(56) References Cited

U.S. PATENT DOCUMENTS

| | | | |
|---|---|---|---|
| 4,723,075 A | 2/1988 | German ................ 250/231 |
| 4,743,763 A | 5/1988 | Cutburth ............... 250/239 |
| 5,303,035 A | 4/1994 | Luecke ................. 356/399 |
| 5,410,206 A | 4/1995 | Luecke ................. 310/328 |
| 5,572,563 A * | 11/1996 | Kasumi et al. ........... 378/34 |
| 6,041,099 A * | 3/2000 | Gutman et al. .......... 378/85 |
| 6,226,349 B1 | 5/2001 | Schuster ............... 378/84 |
| 2002/0080916 A1* | 6/2002 | Jiang et al. ............. 378/84 |

FOREIGN PATENT DOCUMENTS

| | | |
|---|---|---|
| DE | 86 08 623 | 7/1986 |
| DE | 44 07 278 | 9/1995 |
| JP | 09 269 455 | 10/1997 |

OTHER PUBLICATIONS

"Confocal Max-Flux Optics", user manual, Osmic Inc., Troy, Michigan, USA.
Schleifer, M. et al. "Manually and Remotely Operated Ultra-High-Vacuum Double-Axis Mirror Manipulators for the Infrared Beamline at the NSLS", Nuclear Instruments & Methods in Physics Research, Section—A: Accelerators, Spectrometers, Detectors and Associated Equipment, Elsevier, Amsterdam, NL, vol. A266, Nr. 1/3, pp. 402-403.

* cited by examiner

*Primary Examiner*—Mohammed Hasan
(74) *Attorney, Agent, or Firm*—Paul Vincent (57) ABSTRACT

A device for adjusting optical elements, in particular, for X-ray analysis, comprising a holding device (2) for receiving the optical element and at least two adjusting units at least one of the two longitudinal ends of the holding device (2), wherein the adjusting units each comprise one plunger (6, 6*a*, 6*b*, 6*c*, 6*d*), characterized in that each adjusting unit comprises a rotatably disposed adjusting ring (4, 4*a*, 4*b*, 4*c*, 4*d*) with an eccentric recess, and the optical element is mechanically coupled to the inner surfaces (7) of the adjusting rings (4, 4*a*, 4*b*, 4*c*, 4*d*) via the plungers (6, 6*a*, 6*b*, 6*c*, 6*d*). The adjusting device is compact, can be flexibly used and provides simple adjustment of the optical element.

17 Claims, 5 Drawing Sheets

METHOD AND DEVICE FOR ALIGNING AN OPTICAL ELEMENT

This application claims Paris Convention priority of DE 10 2006 015 933.0 filed Apr. 5, 2006 the complete disclosure of which is hereby incorporated by reference.

BACKGROUND OF THE INVENTION

The invention concerns a device for adjusting optical elements, in particular, for X-ray analysis, comprising a holding device for receiving the optical element, and at least two adjusting units, wherein each adjusting unit comprises one plunger. The invention also concerns a method for adjusting an optical element.

A device of this type is disclosed e.g. in the manual "Confocal Max-Flux Optics™" of the company Osmic Inc.

Optical elements, in particular X-ray mirrors, are used in X-ray analysis for monochromatisation, alignment or bundling of X-rays along the path from the X-ray source to the sample and from the sample to the detector.

Multi-layer X-ray mirrors have been used in the optical radiation path for some years in laboratory X-ray analysis devices such as e.g. X-ray diffractometers, and considerably increase the efficiency of the X-ray instruments. Mirrors of this type are disclosed e.g. in DE 198 33 524 and U.S. Pat. No. 6,041,099. These mirrors are mostly parabolic or elliptical and convert the divergent X-rays from laboratory X-ray sources into a parallel or focussed beam. In order to increase the reflectivity, the mirrors have multi-layers that can be produced through coating methods. In order to obtain optimum reflectivity, the thickness of the multi-layers must exhibit a specific functional dependence along the mirror. In X-ray mirrors as disclosed in DE 44 07 278, the layer periods (sum of two individual layers) must e.g. increase from approximately 4 nm to approximately 5 nm from the end of the mirror close to the source towards the end remote from the source. When typical X-ray sources are used with characteristic X-ray energies of between 5 keV and 20 keV, one obtains Bragg angles θ of typically 0.4 to 2 degrees in correspondence with the Bragg relationship (λ=wavelength, d=layer period)

$$\lambda = 2d \sin \theta \quad (1)$$

When multi-layer mirrors are used, the Bragg equation (1) is only an approximation. DE 198 33 524 gives a formula which is more exact than (1). In accordance therewith, the mirrors are operated at small angles of incidence, i.e. under grazing incidence angles. Depending on the selected materials of the multi-layers, the Bragg peaks have widths in the range between 0.25 and 2 mrad, i.e. in the range of a few hundredth degrees (full width at half maximum, i.e. a variation of this value produces a 50% loss in intensity). The X-ray sources used have source sizes of typically some 10 to some 100 micrometers.

In order to optimally align the X-ray optics with the source, very narrow tolerances must be observed. For the above reasons, misalignments of a few micrometers and some thousands of angular degrees already produce significant reflectivity and intensity losses. Temperature changes of a few degrees can cause misalignment of the optics through thermal expansion. Even a change in tube power can cause misalignment of the optics due to the associated temperature change and the associated position change of the tube focus. The optics must be adjusted relative to the X-ray source, and the beam must also be oriented towards the sample to be measured.

This produces a large number of degrees of freedom (in dependence on the type of optics and the application) which must be taken into consideration for optimum operation with fine adjustment. When rotary anode X-ray sources are used, the tube filament is disadvantageously used up after a few months of operation and must be replaced. After such a filament change, the optics must be readjusted. Readjustment of the optics is generally also required when the X-ray tube is changed.

In conventional commercially available adjusting devices, a number of fine-pitch threaded screws are usually utilized to adjust the optics in correspondence with the required degrees of freedom.

U.S. Pat. No. 5,303,035 discloses e.g. moving an inclined surface beneath an adjustment ball using manually operated adjusting screws, and transferring the resulting position change of the ball to the optical element being adjusted.

U.S. Pat. No. 5,410,206 describes a piezoelectric drive for adjusting screws for adjusting optical elements.

In the adjusting device for X-ray mirrors disclosed in the manual "Confocal Max-Flux Optics™" of the company Osmic Inc., the X-ray mirrors to be adjusted are fixed in a holding device. The adjusting elements are at a fixed position. Each change of the relative positions requires complex adjustment of the environment or reconstruction of the optical elements. The optical elements are laterally adjusted by fine-pitch threaded drives that act on the mirror or its holder from the outside. The motion is indirectly transmitted from the outer side of the housing via rods or plungers. Depending on the construction, the adjusting elements project from the sides of the device housing. When motoric drives are used, the lateral space requirements are often considerably increased. X-ray analysis systems usually only have limited installation space. Optimum positioning is often not possible due to cost or construction considerations, such that unfavorable compromises have to be accepted.

Since the X-rays are reflected on the mirror surface only within a very small angular range, the mirrors must be very finely adjusted to both compensate for production and assembly tolerances and also for adjusting the X-rays onto the sample or the detector. Due to the narrow tolerances, mechanical adjustment is often difficult and generally time-consuming, even for experienced experts. Such adjustment is often excessively demanding for the user. Since X-ray analysis today increasingly offers so-called full protection devices for radiation protection, which do not provide adjustment of the open X-ray beam, adjustment of the optics in accordance with prior art requires an extremely demanding iterative process which comprises opening the protective housing, turning one of the adjusting screws, closing the protective housing, measuring the intensity, opening of the protective housing, turning an adjusting screw etc. for each of typically four degrees of freedom.

The above-mentioned adjusting problems limit customer acceptance, and thereby possible economic profit associated with X-ray mirrors as well as other optical X-ray analysis elements which are also difficult to adjust.

It is therefore the underlying purpose of the invention to propose a device of the above-mentioned type which has a compact design and can be flexibly used, and also considerably facilitates adjustment of the optical elements.

SUMMARY OF THE INVENTION

This object is achieved in accordance with the invention in that each adjusting unit comprises a rotatably disposed adjusting ring with an eccentric recess (inner bore), and the optical element is mechanically coupled to the inner surface of the adjusting rings via plungers.

The inventive adjusting device permits adjustment of optical elements in X-ray analysis via several axes, wherein the adjustment of the optical element is advantageously realized in that one adjustable plunger urges the holding device from the rear side of the holding device into the desired position close to each end of the holding device on the longitudinal side, i.e. of the mirror entry and outlet side. The optical element is laterally displaced through turning the respective eccentric adjustment ring on the inner surface of which (surface of eccentric recess) the ends of the plungers, facing away from the optical element, are supported.

This solution is particularly advantageous in that the position of the point of engagement for turning may be at each location of the adjusting ring, i.e. can be freely selected about a periphery of 360°. A further property which is very important for the flexibility is that the inner optical element can also be installed at any angle between 0° and 360°.

Moreover, compared to conventional adjusting devices, the adjusting elements of the inventive adjusting device require very little space. The inventive adjusting device can therefore be installed in systems from the most differing of manufacturers. This is not possible with conventional adjusting devices, since there are functional specifications for the type of adjusting components of conventional adjusting devices depending on the type of system. After the overall system has been put into operation, one often discovers that a different type of adjusting component would have been more advantageous. In most cases, a change is no longer possible or would require great expense.

The inventive adjusting device provides hitherto unknown flexibility in view of possible location, type and arrangement of the drive elements, the type, length and installation position of the used optical elements and the selectable adjusting direction, without having to reconstruct the adjusting device.

In a preferred embodiment, a housing is provided which completely houses the optical element, the holding device and the adjusting rings.

The inventive device can be used with particular advantage when the optical element is an X-ray mirror, a monochromator, a collimator or an aperture slot.

In order to ensure permanent contact between the plungers and the holding device or the rear side of the optical element, at least one of the plungers is advantageously fixed to the holding device or the rear side of the optical element. This is possible, since the plungers are turned with the holding device or the optical element.

Another possibility is that at least one of the plungers is positively connected to the holding device or the rear side of the optical element. In this case, it must be ensured that a force acting on the plunger is transmitted to the optical element.

The plungers advantageously abut positively or non-positively on the inner surfaces of the adjusting rings. In this fashion, the adjusting ring can rotate below the plungers, wherein the plungers are nevertheless displaced due to the eccentricity of the adjusting ring.

In one particularly preferred embodiment of the inventive device, the optical element is disposed in the holding device such that it floats. For adjusting simple mirrors, floating disposal of the holding device on one axis is sufficient. However, for mirrors having two mirror surfaces (double mirrors), a cardanic, two-axes floating support is preferred. This prevents the holding device or the optical element fixed therein from moving in other directions than desired.

In a simple embodiment of the inventive device, the housing has at least one opening for operating the adjusting rings. The adjusting ring can be directly manually adjusted via the opening in the housing.

In one particularly preferred embodiment, each adjusting unit has one adjusting element.

The adjusting element is advantageously an operating wheel which is coupled to the outer surface of the adjusting ring, directly or via intermediate wheels in a positive or non-positive fashion, thereby realizing e.g. a multi-stage transmission with reduction for more exact adjustment of the optical element.

In one simple embodiment of the invention, at least one of the adjusting elements is a knurling wheel or adjusting wheel that can be manually operated.

In particular, when the adjusting devices are difficult to access, at least one of the adjusting elements advantageously comprises a flexible shaft or remote control rods that can be operated from the outside.

With particular advantage, at least one of the adjusting elements comprises a motor which drives the respective adjusting ring associated with the adjusting element.

In a preferred embodiment of the invention, at least one spring element is provided which urges the optical element or the holding device against the plungers and the inner surfaces of the adjusting rings in order to keep the plungers in contact with the holding device.

The present invention also concerns a method for adjusting an optical element for X-ray analysis using an inventive adjusting device, wherein the plungers are guided at the axial ends of the optical element on the inner surface of the adjusting ring in the area of the eccentric recess, wherein, due to the eccentricity of the recess of the adjusting rings, a force is exerted onto the optical element through rotation of the adjusting rings through the fixed or non-positive connection between the plungers and the optical element or the holding device, such that the optical element is radially displaced in correspondence with the deflections of the eccentric inner bores of the adjusting rings, wherein the adjusting units can be operated independently of each other.

The adjusting rings can be operated manually or by a motor.

The adjusting rings are advantageously operated using a gear or transmission reduction, which increases the adjustment resolution.

Further advantages of the invention can be extracted from the description and the drawing. The features mentioned above and below may be used individually or collectively in arbitrary combination. The embodiments shown and described are not to be understood as exhaustive enumeration but have exemplary character for describing the invention.

DESCRIPTION OF THE PREFERRED EMBODIMENT

Figure 1:
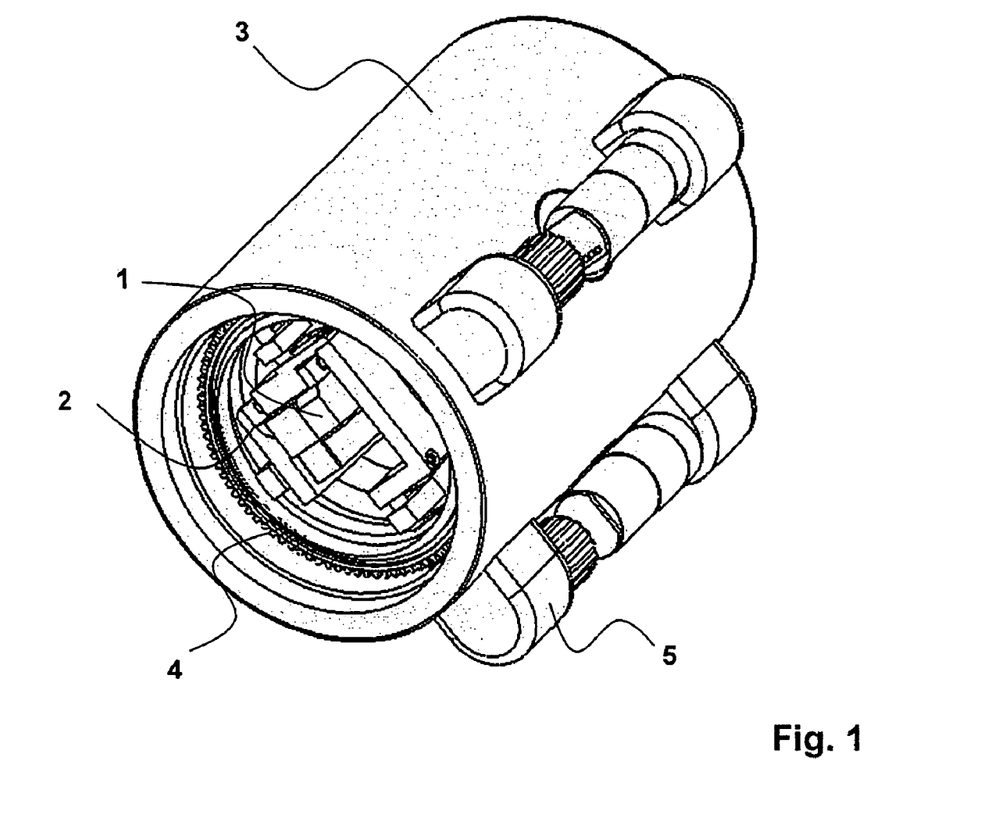
FIG. 1 shows a preferred embodiment of the inventive adjusting device in the completely assembled state.

FIG. 1 shows an inventive adjusting device for adjusting optical elements. The optical element, in the present case a mirror 1, is fixed in a holding device 2 which is disposed within a housing 3. The mirror may be fixed e.g. magnetically. The inventive adjusting device comprises adjusting units which each comprise one rotatably disposed adjusting ring 4 with an eccentric recess, and one adjusting element 5.

The inventive adjusting device is preferably used for adjusting X-ray mirrors. There are two different types of X-ray mirrors: mirrors with a reflection surface and mirror combinations with two reflection surfaces. The reflection surfaces itself may have the most differing surface shapes, depending on the function. The surface may be one-dimensionally concave, convex or planar or follow a complex mathematical function, e.g. a parabolic or elliptical function. It may also be deformed in the second dimension, such that the reflecting surface corresponds e.g. to a paraboloidal trough.

For adjusting "simple" mirrors, i.e. mirrors with only one reflection surface using the inventive adjusting device, only two adjusting units are generally required, since simple mirrors must be laterally displaced in only one direction and must be adjusted along the beam axis to adjust the reflection.

Figure 2:
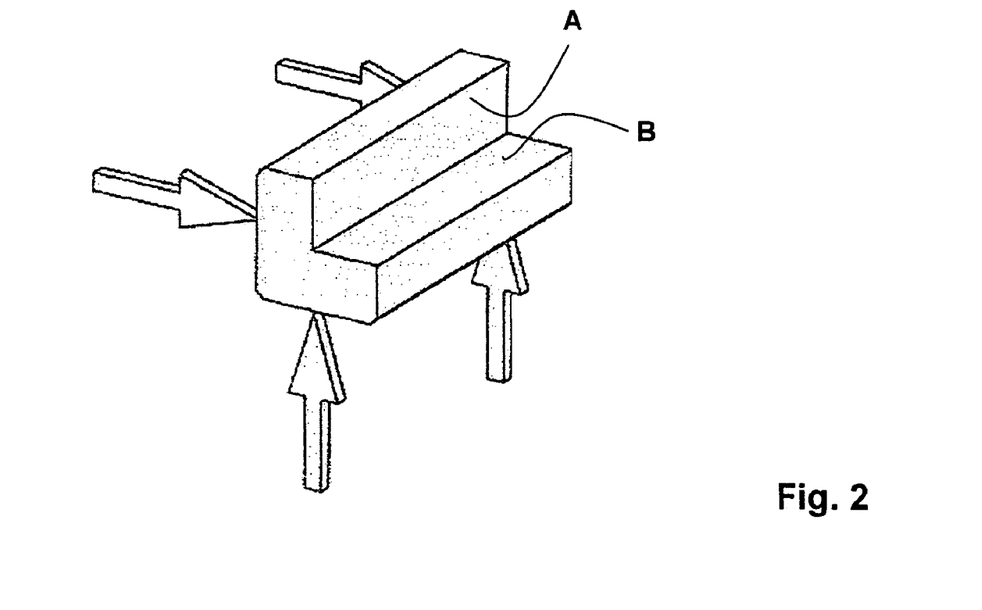
FIG. 2 shows points of engagement of the adjusting units of the inventive adjusting device on an optical element.

"Double" mirrors consist of two simple mirrors which are fixed relative to each other at an angle of 90°, each comprising a mirror surface A and B (FIG. 2). They are produced and installed as a single unit. Four degrees of freedom can be adjusted in double mirrors. Correspondingly, four adjusting units are reasonable for the inventive adjusting device.

Conventional adjusting mechanisms have been designed and developed generally only for one type of mirror or for a certain application. When the requirements change, the constructions of the adjusting mechanisms are changed or new devices are developed.

The type of mirror is not important for the inventive adjusting device. All described types can be directly used. The set-ups differ only in view of shape and geometrical dimensions of the holding device 2 and the number of adjusting units.

In addition to single and double mirrors, the inventive adjusting device can also be used in X-ray analysis with other optical elements, such as e.g. multi-layer, Goebel mirrors®, monochromators, collimators, aperture slots etc. i.e. elements which must be finely adjusted and shifted in the optical path. All of these components can be installed in the inventive adjusting device.

The length of the optical elements to be adjusted is not important in the inventive adjusting device. Optical elements of different lengths are produced. Standard lengths for X-ray mirrors are e.g. 60 mm, 80 mm, 100 mm, 120 mm, and 150 mm. Mirror lengths of 200 mm and more are feasible. All sizes can be used for the inventive adjusting device. The set-ups differ merely in view of total length of the housings 3 and the holding device 2. Since the adjusting elements 5 are positioned close to the front and rear ends of the optical elements as a standard (FIG. 1), the dimensional position of the adjusting elements 5 on the housing is fixed. This means in practice, that the production specifications for each length of the optical elements differ only with respect to two dimensions, the housing length and the length of the holding device 2, and are otherwise identical.

The optical element shown in the illustrated embodiments is a "double" mirror 1 of the type "Montel" in accordance with U.S. Pat. No. 6,041,099. Both mirror surfaces A and B must be adjusted independently of each other, i.e. their angle along the X-ray central axis (adjustment of the angle of incidence and reflection) and laterally, parallel to the X-ray central axis. FIG. 2 shows the points where the inventive adjustment device engages to perform corresponding adjustments.

The mirror 1 is adjusted in the inventive adjusting device through lateral shifting thereof 1 (i.e. with a component perpendicular to the longitudinal axis of the mirror 1) using the adjustment ring 4. The adjusting unit comprises a plunger 6 proximate each mirror input and output side. The plunger 6 is guided on the inner surface 7 of the adjusting ring 4, i.e. on the eccentric inner bore of the adjusting ring 4 and non-positively abuts the adjusting ring 4 or is coupled thereto in a positive manner. The plunger 6 is rigidly connected to or non-positively abuts the mirror 1 or its holding device 2 or is coupled to the mirror 1 or its holding device 2 in a positive manner. The mirror rear side is thereby connected to the adjusting ring 4 via the plunger 6. The plunger 6 urges the holding device 2 from its rear side into the desired position.

Figure 3A:
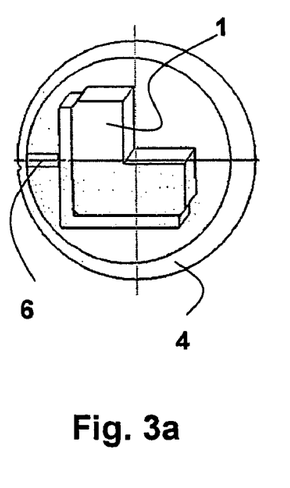
FIGS. 3a-c show different positions of the adjusting unit of the inventive adjusting device.
Figure 3B:
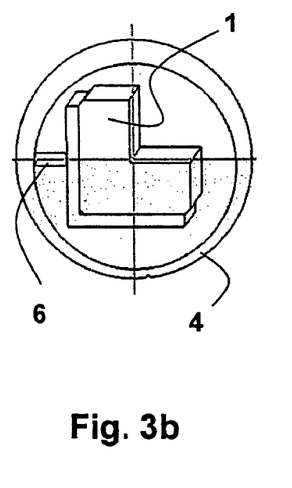
Figure 3C:
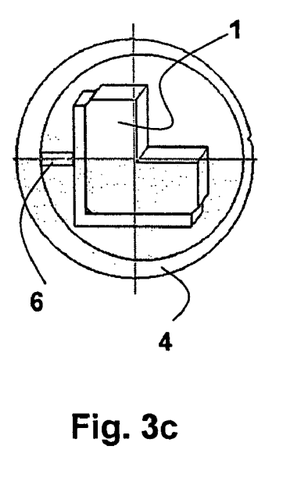

FIGS. 3a-c show the adjustment principle of the inventive adjusting device by means of different adjustment positions of the mirror. The crosshair inserted into FIGS. 3a through c shows that the plunger 6 that abuts the inner surface 7 of the adjusting ring 4 displaces the mirror 1 in correspondence with the eccentric deflection when the adjusting ring 4 is rotated.

Figure 4:
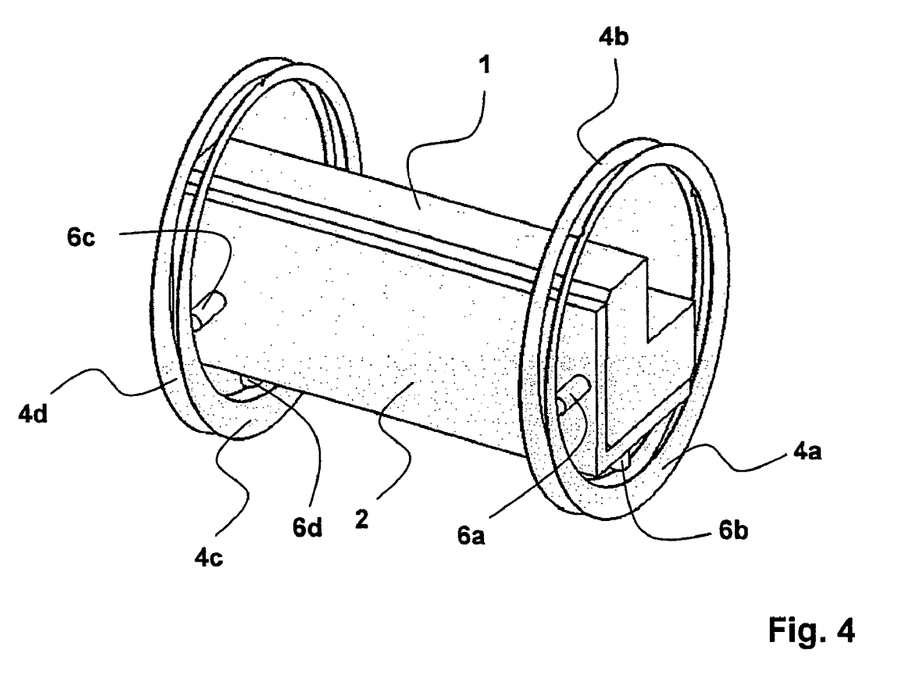
FIG. 4 shows an embodiment of the inventive adjusting device with four adjusting units.

FIG. 4 shows a three-dimensional illustration of the arrangement of the adjusting units relative to the mirror 1 to be adjusted. Each point of engagement shown in FIG. 2 has an adjusting unit comprising an adjusting ring 4a, 4b, 4c, 4d with an eccentric recess and a plunger 6a, 6b, 6c, 6d, on the longitudinal ends of the holding device 2. Each adjusting unit can be adjusted independently of the other adjusting units. The mirror 1 is adjusted in one direction in each case through turning the respective eccentric adjusting ring 4a, 4b, 4c, 4d on its outer diameter.

Figure 5:
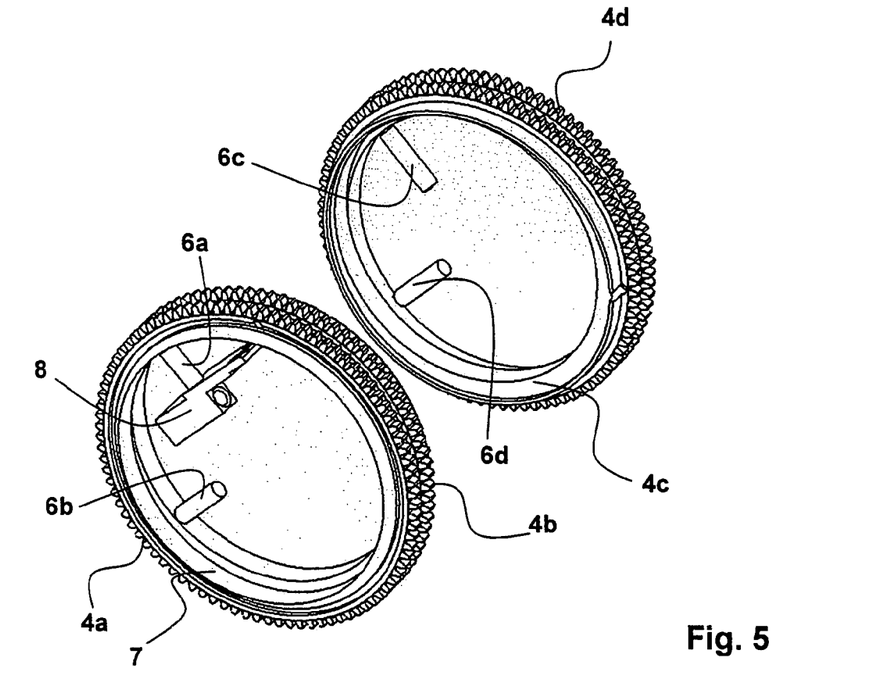
FIG. 5 shows adjusting units of an embodiment of the inventive adjusting device with toothed wheel adjusting rings (assembly stage 1)

In the simplest case, the turning force required for adjusting the adjusting rings 4a, 4b, 4c, 4d is an external manual force. This simple type of coupling the rotary motion is suitable for certain tasks. However, the resolution is insufficient for many applications. The adjusting rings 4a, 4b, 4c, 4d of the inventive adjusting device are therefore preferably provided with a standard toothing (FIG. 5). The corresponding adjusting ring 4a, 4b, 4c, 4d may thereby be outwardly coupled to a drive component via toothed wheels. An externally disposed drive wheel may act on the adjusting ring via an intermediate toothed wheel (not shown), thereby causing a reduction and improving the resolution of the rotary motion.

FIGS. 5 through 9 show, in detail, the construction of a complete adjusting device. They show the function elements in the arrangement, from the inside to the outside. Components that impair the vision were eliminated in the individual figures.

Figure 6:
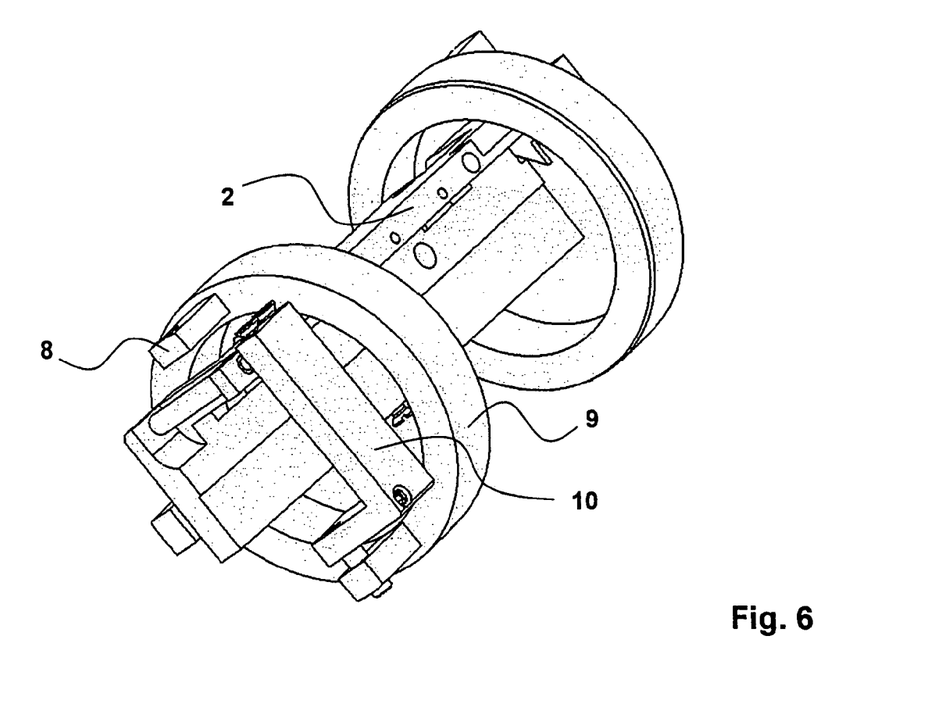
FIG. 6 shows the suspension of the holding device of the inventive adjusting device (assembly stage 2)

FIG. 5 shows the first mounting stage of a preferred embodiment of the inventive adjusting device. The plungers 6a, 6b, 6c, 6d non-positively abut the inner surface 7 of the respective adjusting ring 6a, 6b, 6c, 6d. A guiding means 8 guides the plunger 6a and is fixed in a bearing insert 9 of the adjusting device. FIG. 6 shows the second mounting stage of one embodiment of the inventive adjusting device comprising the bearing inserts 9, the holding device 2, and a cardan suspension 10 of the holding device 2. The cardan suspension 10 permits individual adjustment of the optical element in the individual spatial directions.

In the third mounting stage (FIG. 7), the components of FIGS. 5 and 6 are assembled. In correspondence with the required number of adjustments, the four adjusting rings 6a, 6b, 6c, 6d with toothed gearings are disposed one after the other. The mirror 1 or its holding device 2 is pressed against the plungers 6a, 6b, 6c, 6d using spring elements 11a, 11b (pressure springs). The rear side of the mirror 1 is therefore connected to the inner surfaces 7 of the eccentric adjusting rings 4a, 4b, 4c, 4d via the plungers 6a, 6b, 6c, 6d which abut the mirror 1 or its holding device 2 due to the pretensioning forces introduced from the outside.

Figure 7:
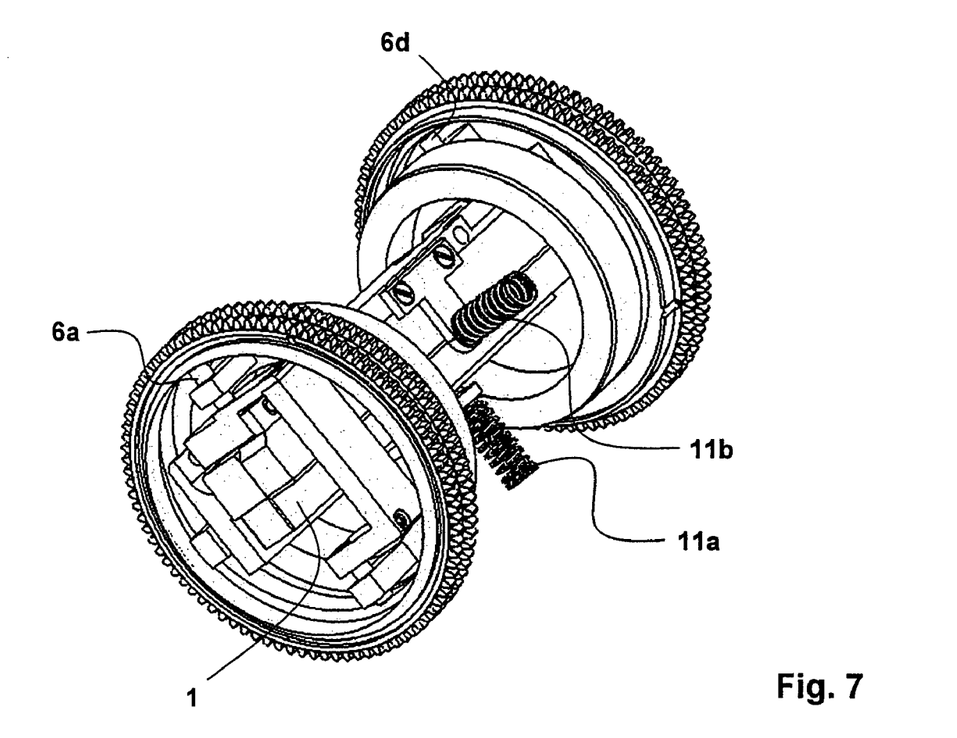
FIG. 7 shows an embodiment of the inventive adjusting device with the mounted elements of FIGS. 4 and 5 (assembly stage 3)
Figure 8:
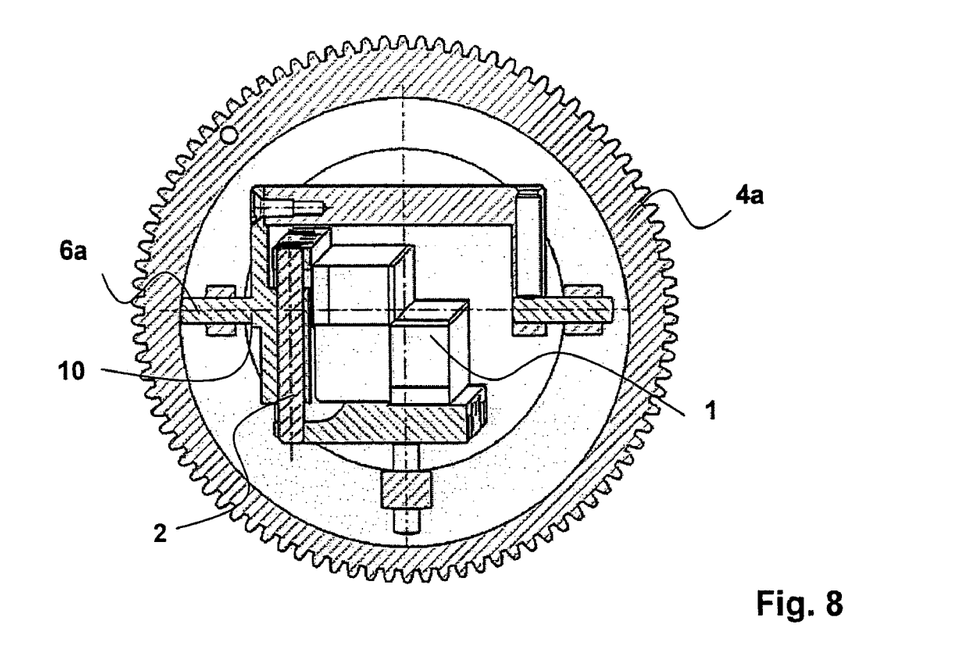
FIG. 8 shows a cross-section through the construction shown in FIG. 6.

FIG. 8 shows a cross-section through the mounting stage of FIG. 7 with the two-axes floating cardanic bearing 10 (linear and pivot bearing) of the holding device 2 with mirror 1. It also shows the plunger 6a that abuts the inner surface 7 of the eccentric inner bore of the adjusting ring 4a.

Figure 9:
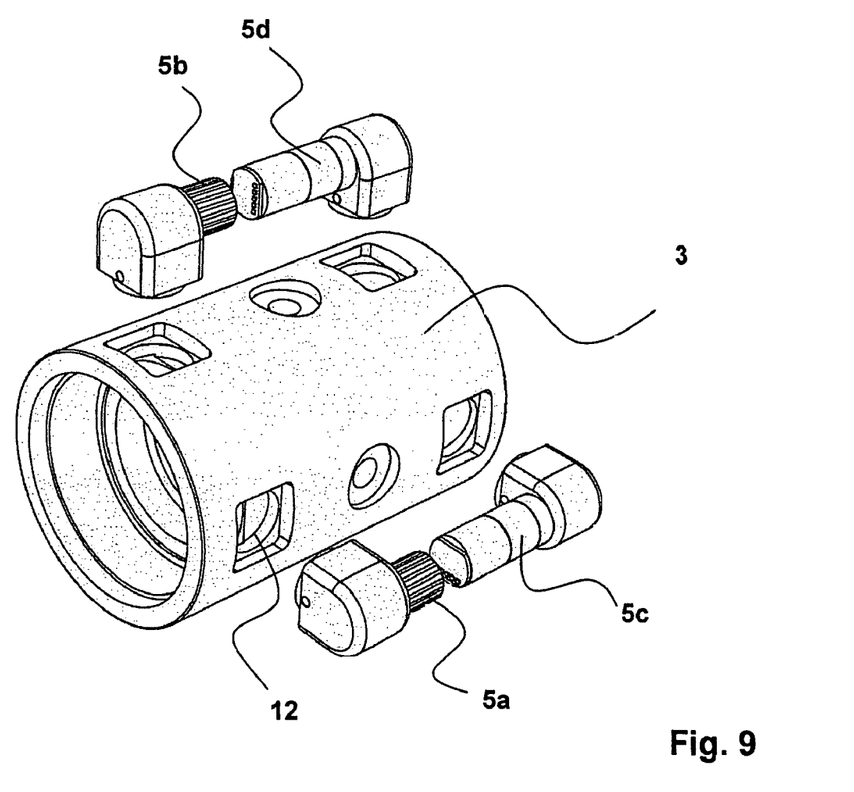
FIG. 9 shows an exploded view of a housing and associated adjusting elements for the inventive adjusting device.

FIG. 9 shows the housing 3 that surrounds the actual adjusting device. The housing 3 has several openings 12 through which the adjusting rings can be turned. Towards this end, each adjusting ring has an adjusting element 5a, 5b, 5c, 5d. The adjusting elements 5a, 5b, 5c, 5d are illustrated in FIG. 9 as operating wheels, preferably in the form of toothed wheels which engage the toothed wheel structure of the adjusting rings shown in FIGS. 5, 7, and 8. The coupling between the adjusting rings 4a, 4b, 4c, 4d and the operating wheels located outside of the housing 3 is thus designed as a toothed wheel gearing e.g. in the form of a spur wheel gear. The connection between the adjusting ring and the operating wheel may be non-positive (e.g. in the form of a toothed wheel or toothed belt drive) or positive e.g. in the form of a friction wheel, a flat belt or a V-belt drive.

In the embodiment of FIG. 9, the adjusting rings are manually adjusted via adjusting elements 5a, 5b, whereas the adjusting elements 5c, 5d are driven by a motor.

Figure 10:
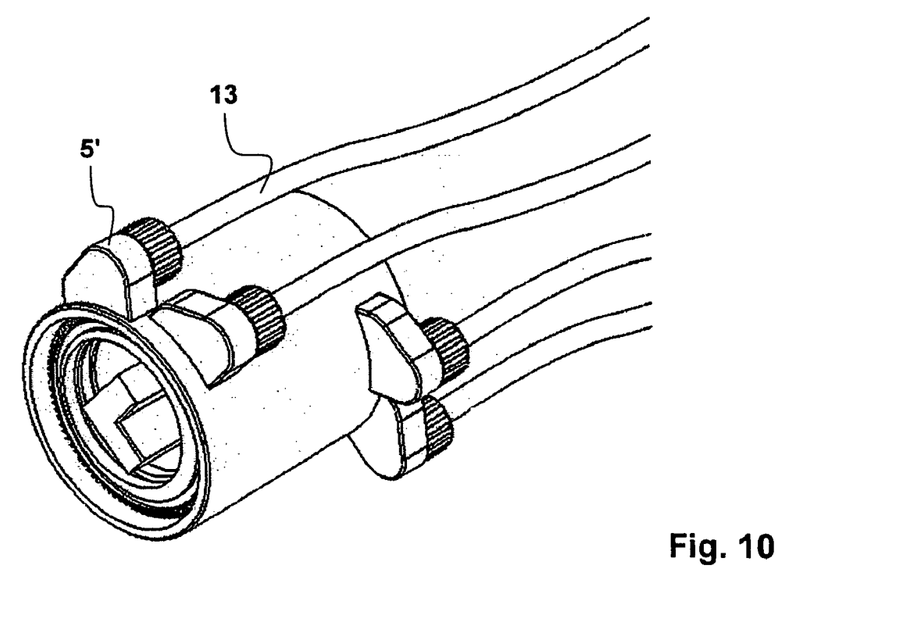
FIG. 10 shows an alternative embodiment of the housing for the inventive adjusting device with flexible shafts as adjusting elements.

Motor drives are formed with step motors, closed-loop or open-loop DC motors or servo drive. These are generally disposed outside of the housing 3. Another possibility is to completely integrate the motor in the housing, wherein the overall housing 3 becomes larger (extended radiation protection) or is provided with corresponding bulgings (joined or produced from one block). A shaft encoder or position request may moreover be provided. Knurled screws or adjusting screws, flexible shafts 13 or rods for remote control (FIG. 10) are used as mechanical adjusting elements.

In order to dispose the drive, e.g. the motor, at a sufficiently large separation from the housing, the adjusting elements advantageously have additional intermediate wheels. When the gear is a multi-stage gear, the motion may be reduced, thereby improving the resolution of the device (interconnected reduction gear).

Most common adjustments are designed only for one type of all possible drives. Conversion e.g. of a mechanical adjusting screw to a step motor drive involves in most cases expenses for production or assembly. Adapters and deflections are generally required.

In contrast thereto, in the inventive adjusting device, the above-mentioned adjusting possibilities can be freely selected in correspondence with the different technical specifications and requirements for adjustment of the optical element, such that different types of drive can be realized within one construction. The conversion of e.g. a mechanical adjustment screw to a step motor drive can be realized at any time by releasing two screws. No additional space is required.

Advantageously, the space required for the inventive adjusting device is very small, since the adjusting elements 5a, 5b, 5c, 5d are parallel to the active axis of the X-rays and are mounted close to the housing 3. The lateral space requirements are no larger than e.g. the diameter of the inserted adjustment knurled handle for manual drive and does not increase when changing over to a motor drive. The small torque required by the adjusting elements permits use of standard micro motors with sufficiently small dimensions.

The direction in which the individual adjusting drives face can be independently selected at each adjusting point. This is useful e.g. for remote control using flexible shafts. For short mirrors or short housings, the adjusting elements 5a, 5b, 5c, 5d with drives must possibly be disposed offset from each other.

The inventive adjusting device can be used in systems of the most different manufacturers. Depending on the overall construction of the system, the space requirements differ greatly. The available installation space is usually limited. The adjusting device and, in particular, the adjusting elements for manual adjustment are accessible in areas determined by the overall construction which are often narrow. Due to construction, the position of the adjusting elements of conventional adjustments is matched during later installation in a certain overall system and fixed in the design. Shifting of the adjusting elements requires extensive new construction.

In contrast thereto, the position of the adjusting elements 5a, 5b, 5c, 5d of the inventive adjusting device can be freely selected. It is limited only in that the individual adjusting elements 5a, 5b, 5c, 5d of the adjustment device must be able to pass each other. The position of the openings 12 in the mirror housing 3 for the adjusting elements 5a, 5b, 5c, 5d is inserted in the production drawing as an angular dimension and can be freely selected within the full range from 0° to 360° on the outer periphery of the mirror housing 3.

Even after completion and assembly, the position of the adjusting elements 5a, 5b, 5c, 5d can be largely freely changed as a group. Since the mirror housing 3 has a cylindrical shape, it is sufficient to rotate the housing 3 in its mounting to the desired angle. In addition thereto, the installed optical element including its holding device 2 must be turned back and screwed tightly in its desired position which is easy with the inventive structure. As a standard, threads for the mounting screws are provided at separations of 45°. Additional threads may be provided for intermediate positions.

One further positive point that distinguishes the inventive adjusting device from prior art is the flexibility relative to the installation angle of the optical element.

The angular position of the mirror is fixed in conventional mirror adjusting mechanisms. The mirror adjusting mechanism is turned completely, i.e. with housing, adjusting elements and all side parts, until the mirror is in the desired angular position. When the task changes or the mirror adjusting mechanism shall not only be used for one application but also for different tasks, the overall mirror adjusting mechanism must be turned into the new angular position. The adjusting elements no longer point in the optimum direction which was selected in dependence on the constructive solution to provide good operability or to suit the existing installation space.

The installation position of the optical element can be freely determined in the inventive adjusting device. The optical element or its holding device 2 is pushed in the housing 3 like a piston in a cylinder and can be turned and fixed at any angle between 0° and 360°, preferably horizontally, perpendicularly, and through 45°. The inner position of the optical element is independent of the position of the adjusting elements 5a, 5b, 5c, 5d, which may remain untouched in their former position during any, even later changes.

Towards this end, the optical element or its cardan suspension 10 is mounted in the housing 3 using four screws. For turning the optical element, the mounting screws in the housing are released, the optical element is turned into the new position, and the screws are screwed into the corresponding threads.

The inventive adjusting device is also advantageous in view of the adjusting range and the resolution of the adjusting device.

In conventional mirror adjusting mechanisms, the possible adjusting range is primarily determined by the feasible lift of the adjusting elements. The possible installation space is neglected as a factor that limits the adjusting range, since only small lifts are required to adjust the mirror. In practice, angular adjusting ranges of ±0.5° to ±1.0° are sufficient. They mainly serve as a compensation of production and assembly tolerances and to a small extent for adjustment of the X-rays onto the sample or the detector. The lateral adjustment range is ±1.5 mm. It compensates for the installation tolerances of the radiation source in the X-ray tube and aligns the X-rays onto the sample, or the detector.

The required resolution of the adjusting motions depends on the type of mirror used and the measuring task. Currently relevant applications require a resolution of the adjusting motion of more than 0.02°.

The lift of the adjusting devices used up to now can be fixed relatively freely. It is delimited by spatial limits and stability conditions. The required lift areas of adjustment are reliably controlled within these limits. However, the possible resolution of the adjusting devices with manual operation used up to now is determined by the increase of the adjusting spindle and the diameter of the adjustment screw handle. Technically suitable thread pitches of up to 0.35 mm and division of the manual rotary motion into 50 steps for a diameter of the adjusting knurl handle of 15 mm provide a resolution of mirror adjustment of approximately 0.01°.

The possible lateral adjustment path of the inventive adjusting device is exclusively determined by the eccentricity of the inner bore of the adjusting ring. The angular adjustment range is determined by the eccentricity of the inner bore of the adjusting ring and the separation between the two cooperating adjusting units. The possible resolution with manual operation is determined by the eccentricity of the inner bore of the adjusting ring, the separation between the cooperating adjusting units, any possible reduction of the rotary motion of the adjusting ring to the adjusting knurl handle, and the diameter of the adjusting knurl handle. For motor drive, the parameter "diameter of the adjusting knurl handle" is replaced by the reduction gear between the motor and coupling.

In a practical construction, the following parameters were used.

| | |
|---|---|
| eccentricity of the inner bore of the adjusting ring | ±1.5 mm |
| separation between the two cooperating adjusting units: | 90 mm |
| reduction of the rotary motion of the adjusting ring to the knurl handle: | 5:1 |
| diameter of the adjustment knurl handle | 14 mm |

This produced an adjusting range of ±0.95° for a resolution of 0.004° and more. Since the adjusting path corresponds to a sine curve, the actual resolution becomes finer towards the two points of reversal.

The specified values for adjustment path and resolution can be freely selected through large ranges by selection of the parameters "eccentricity of the inner bore of the adjusting ring" and "separation between the two cooperating adjusting units". It must thereby be noted that the variables for adjusting path and resolution are inversely proportional. In practice, an eccentricity of ±3 mm will not be exceeded and the separation between the two cooperating adjusting mechanism will not exceed the length of the optical element.

The novel construction of the inventive adjusting device realizes a variety of embodiments and adjustment to system-related specifications and limitations that have not been possible up to now, with minor, or without any adjustments to the adjusting device. This has the following advantages:

very little space required for the adjusting elements
mounting of the most different drive systems without intervention with the construction
mounting of the most different drive systems without requiring additional space
largely free selection of the angular position of the drive systems on the cylindrical housing surface
largely free selection of the type of the optical elements, single or double mirrors, surface design of mirrors, multilayer, Goebel mirrors®, monochromators, collimators, aperture slots
largely free selection of the length of the optical elements with the same construction
free selection of the position of the optical elements in the housing, that can be changed at any later time
adjustment range and resolution of the adjustment can be adjusted to different specifications

| List of Reference Numerals | |
|---|---|
| 1 | mirror |
| 2 | holding device |
| 3 | housing |
| 4, 4a, 4b, 4c, 4d | adjusting ring |
| 5, 5a, 5b, 5c, 5d | adjusting element |
| 6, 6a, 6b, 6c, 6d | plunger |
| 7 | inner surface |
| 8 | guiding means |
| 9 | bearing insert |
| 10 | cardan suspension |
| 11a, 11b | spring element |
| 12 | opening |
| 13 | flexible shaft |
| A | first mirror surface |
| B | second mirror surface |

We claim:

1. A device for adjusting an optical element or an X-ray analysis optical element, the device comprising:
a holding device;
a first adjusting ring having a first inner surface defining a first eccentric opening, said first ring mounted in said holding device for rotation relative thereto;
a first plunger in sliding cooperation with said first inner surface at a first region thereof and cooperating with the optical element, wherein said holding device, said first adjusting ring, and said first plunger are disposed, structured and dimensioned such that rotation of said first adjusting ring relative to said holding device produces translation of said first plunger to displace the optical element in a direction substantially transverse to said first region;

a second adjusting ring having a second inner surface defining a second eccentric opening, said second ring mounted in said holding device for rotation relative thereto; and a second plunger in sliding cooperation with said second inner surface at a second region thereof and cooperating with the optical element, wherein said holding device, said second adjusting ring, and said second plunger are disposed, structured and dimensioned such that rotation of said second adjusting ring relative to said holding device produces translation of said second plunger to displace the optical element in a direction substantially transverse to said second region.

2. The device of claim 1, further comprising a housing within which said holding device is completely disposed.

3. The device of claim 1, wherein the optical element is an X-ray mirror, a monochromator, a collimator, or an aperture slot.

4. The device of claim 1, wherein at least one of said first and said second plungers is rigidly connected to said holding device or to a rear side of the optical element.

5. The device of claim 1, wherein at least one of said first and said second plungers is non-positively connected to said holding device or a rear side of the optical element.

6. The device of claim 1, wherein said first and said second plungers abut against said inner surfaces of said adjusting rings in a positive or non-positive manner.

7. The device of claim 1, wherein the optical element is suspended in said holding device in a floating fashion.

8. The device of claim 2, wherein said housing has at least one opening for actuating said adjusting rings.

9. The device of claim 1, wherein said first adjusting ring and said first plunger comprise a first adjusting unit having a first adjusting element and said second adjusting ring and said second plunger comprise a second adjusting unit having a second adjusting element.

10. The device of claim 9, wherein said first or second adjusting element is an operating wheel, which is non-positively or positively coupled to an outer surface of said first or second adjusting ring, either directly or via intermediate wheels.

11. The device of claim 9, wherein said first or second adjusting element is a manually operable knurl or adjusting wheel.

12. The device of claim 9, wherein at least one of said first and said second adjusting elements comprises a flexible shaft that can be operated from an outside or comprises remote control rods.

13. The device of claim 9, wherein said first or second adjusting element comprises a motor which drives said first or second adjusting ring.

14. The device of claim 1, further comprising a first or second spring element which presses the optical element or said holding device against said first or second plunger and an inner surface of said first or second adjusting ring.

15. A method for adjusting an optical element for X-ray analysis using the device of claim 9, wherein said plungers are guided at axial ends of the optical element on inner surfaces of said adjusting rings in an area of said eccentric openings, wherein, due to eccentricity of said openings of said adjusting rings, a force is exerted on the optical element by rotating said adjusting rings via fixed or non-positive connection between said plungers and the optical element or said holding device, such that the optical element is radially shifted in correspondence with deflections of said eccentric opening of said adjusting rings, wherein said adjusting units can be operated independently of each other.

16. The method of claim 15, wherein said adjusting rings are operated manually or by a motor.

17. The method of claim 15, wherein said adjusting rings are operated using gear reduction.

* * * * *